July 25, 1944.
F. R. SIAS
2,354,555
TEMPERATURE INDICATOR
Filed Nov. 9, 1942
2 Sheets-Sheet 1
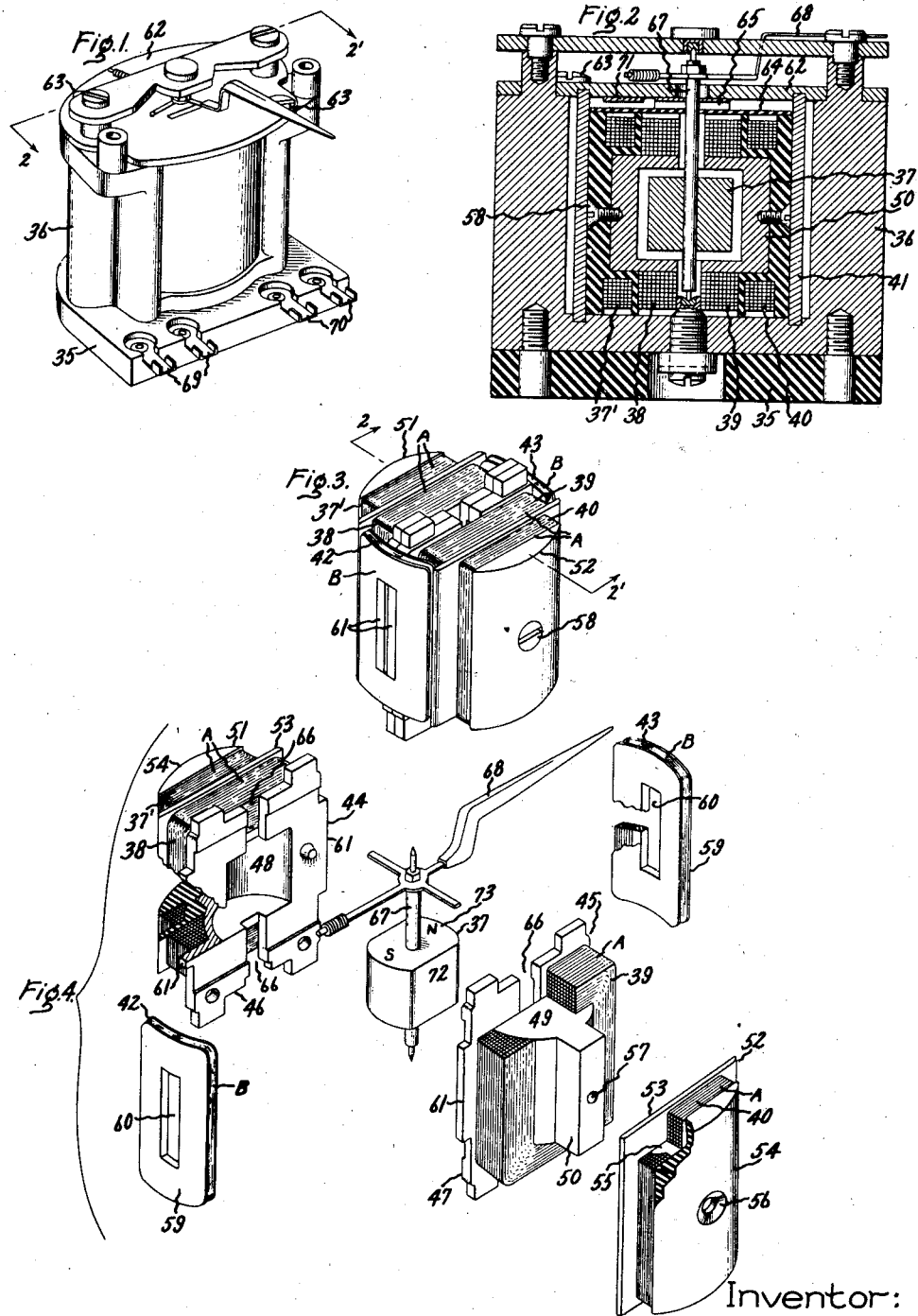
Inventor:
Frederick R. Sias,
by Harry E. Dunham
His Attorney.

July 25, 1944.  F. R. SIAS  2,354,555
TEMPERATURE INDICATOR
Filed Nov. 9, 1942  2 Sheets-Sheet 2
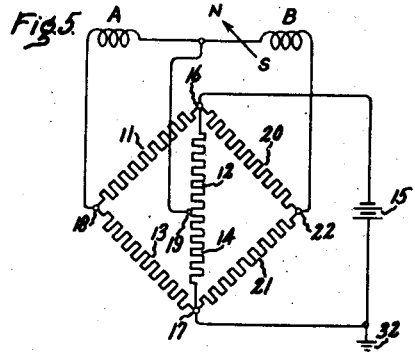
Inventor:
Frederick R. Sias,
by Harry E. Dunham
His Attorney.

Patented July 25, 1944

2,354,555

UNITED STATES PATENT OFFICE 2,354,555

TEMPERATURE INDICATOR

Frederick R. Sias, Marblehead, Mass., assignor to General Electric Company, a corporation of New York Application November 9, 1942, Serial No. 465,079

10 Claims. (Cl. 171—95)

My invention relates to current responsive apparatus and concerns particularly electrical indicating devices and systems.

It is an object of my invention to provide a long scale indicator or measuring device especially adapted for indication of temperature or resistance or other quantities, or for remote position indication as in remote indicating float gauges, for example.

Another object of my invention is to provide an improved circuit for an indicating system providing ambient temperature compensation and scale angle adjustment. Claims directed to the improved circuit features described herein are contained in my divisional application Serial No. 490,347, filed June 10, 1943.

A further object of the invention is to provide an indicator in which various desired shapes of calibration curve may be obtained and in which a highly linear calibration curve in particular may be obtained.

Still another object of my invention is to provide an improved light weight construction for a current responsive device or ratio instrument fitting into an unusually small space.

Other and further objects will become apparent as the description proceeds.

In carrying out my invention in its preferred form for the measurement of temperature I utilize a Wheatstone bridge circuit having constant resistance arms and an arm which varies in resistance in accordance with variations in temperature, and I employ a two-circuit current responsive instrument having one winding connected as the diagonal arm or bridge balance responsive element and having another winding so connected as to provide a controlling torque.

In the form of my invention which I now consider the preferred form the current responsive instrument comprises a cross coil instrument having the main winding mechanically divided into several parts, and having the auxiliary winding mechanically divided into two parts mounted with a magnetic axis at right angles to the magnetic axis of the main winding, having fewer turns and having less pole width than the main winding so as to provide a narrow magnetic field in comparison with the main winding. To cooperate with the electrical windings, I provide a permanent magnet rotor of high coercive force light weight magnetic material having the shape of a flattened right circular cylinder magnetized transversely to its axis in a direction parallel to the flattened sides. The apparatus is so arranged that the rotor is in its mid scale position when the magnet is in alignment with the magnetic axis of the auxiliary winding so as to give the auxiliary winding the greatest effect upon the rotor when it is in the mid scale position.

A better understanding of my invention will be afforded by the following detailed description considered in connection with the accompanying drawings, and those features of the invention which are believed to be novel and patentable will be pointed out in the claims appended hereto.

In the drawings Fig. 1 is a perspective view of a cross-coil current-responsive instrument forming one embodiment of my invention; Fig. 2 is a view showing a section cut by plane 2—2' passing through the rotor axis of the apparatus of Fig. 1; Fig. 3 is a perspective view, slightly enlarged, of the inner mechanism of the apparatus of Fig. 1 shown as turned 90 degrees from its position within the device as illustrated in Fig. 1; Fig. 4 is an exploded perspective view of the mechanism of Fig. 3 with the rotor shaft and pointer shown in addition; Fig. 5 is a schematic electric circuit diagram for one embodiment of my invention for measuring temperature; Fig. 5A is a schematic diagram explaining the principle of operation of the apparatus of Fig. 5; Fig. 5B is a fragmentary diagram of a modification in the arrangement of Fig. 5; Fig. 6 is a circuit diagram of a modification in the arrangement of Fig. 5 utilizing a simplified circuit; Fig. 7 is a schematic circuit diagram illustrating a circuit for a resistance type temperature measuring system which is especially well adapted for an instrument of the type illustrated in Figs. 1 to 4; Fig. 8 is a vector diagram explanatory of the principle of operation of the apparatus of Fig. 7 and the manner in which temperature compensation is obtained; and Fig. 9 is a vector diagram explanatory of the principle of operation of the instrument illustrated in Figs. 1 to 4 and showing the manner in which linear scale calibration is obtained. Like reference characters are used throughout the drawings to designate like parts.

Wheatstone bridge circuits may be utilized for the measurement of temperature if one of the arms of the bridge is composed of resistance material with an appreciable temperature coefficient of resistance in comparison with other arms of the bridge. A single coil instrument, such as a galvanometer or a milliammeter, may be connected in the diagonal arm of the bridge and variations in temperature will cause variations in the condition of balance or extent of unbalance of the bridge so as to produce variations in current and, consequently, deflection of the instrument in response to variations in temperature.

The effect of variations in voltage of the current source for energizing the bridge may be overcome or minimized by using a ratio type of instrument or cross-coil instrument having a main winding responsive to the condition of balance of the bridge and an auxiliary winding connected to the current source. I have found that an improved long scale indicating system with the pointer scale approximating 150 degrees may be produced by various modifications of the basic Wheatstone bridge resistance type temperature measuring system.

In Fig. 5 I have illustrated one embodiment of my invention in which a double bridge circuit is employed and a current responsive instrument is employed having operating coils connected with magnetic axes substantially at right angles. The coils or windings of the instruments are connected in the cross arms of the respective bridge circuits.

As illustrated in Fig. 5 one of the bridge circuits consists of resistors 11, 12, 13 and 14 connected in series parallel to a source of energization current such as a battery 15 with input terminals 16 and 17 serving as the energizing terminals of the bridge and terminals 18 and 19 serving as the conjugate terminals of the bridge across which the diagonal arm may be connected. The diagonal arm consists of a coil A which forms one of the windings of a cross coil current responsive instrument. The second bridge has two arms in common with the first bridge and comprises, in addition to the resistors 12 and 14, a second pair of resistors 20 and 21 connected in series between the energizing terminals 16 and 17 which are common to the first bridge and are connected to the battery 15. The conjugate terminals of the second bridge consist of the terminal 19 and the junction terminal 22 of resistors 20 and 21, and the diagonal arm of the second birdge consists of a coil B which forms the second winding of the cross-coil instrument.

Two of the resistors forming symmetrically arranged arms of the double bridge circuit, for example, the resistors 13 and 21, are composed of a material the resistance of which varies appreciably with temperature in comparison with the temperature effect of the other resistors. Preferably, in order to accentuate the effect, the other resistors are composed of a material which has little or no temperature coefficient of resistance such as maganin or constantin, for example, or some other suitable material well known to those skilled in the art. The resistors 13 and 21 may be composed of copper or nickel wire or any other suitable material known to those skilled in the art having a relatively high temperature coefficient of resistance.

For the type of operation desired under ordinary circumstances, it is preferable to select the dimensions of the electric circuit elements of the resistance bridge arms so that the bridge circuits will be balanced at two different temperatures within the desired range of temperature indication. For normal conditions the preferred arrangement is to have one of the bridge circuits balance at a temperature representing 1/5 the desired total scale angle and the other bridge circuit balanced at a temperature representing 4/5 of the desired total scale angle.

Let it be assumed, for instance, that the bridge consisting of the elements A, 11, 12, 13 and 14 is balanced at a temperature 1/5 the way up scale from the minimum temperature to be measured by the apparatus. When this temperature exists no current will flow in the coil A and the direction of the magnetic flux will be determined wholly by the position of the coil B. The cross-coil instrument comprising the coils A and B is represented schematically in Fig. 5A where the coils A and B are shown mounted at right angles to one another with magnetic axes intersecting and with a transversely magnetized rotor 23 mounted with the axis of rotation passing through the intersection of the magnetic axes of the coils A and B and perpendicular thereto. If desired, the windings A and B may each be divided into two coils connected in series and mounted on opposite sides of the rotor 23. The current responsive instrument may be of the type illustrated in Patent No. 2,248,616, granted to Faus, but with four coils and with the opposite coils connected in series and in separate circuits to form the windings A and B.

As the temperature deviates above or below the value at which zero current flows in the coil A, the bridge including the coil A will be unbalanced in one direction or the other, and current will flow through the coil A in one direction or the other producing deflection of the rotor 23 according to the direction of deviation of the temperature. At the assumed temperature 1/5 of the way up the scale, when the amount of current flowing in the coil A is zero and the position of the rotor 23 is determined entirely by the coil B, the magnetic rotor 23 will take up a position with its poles NS along the magnetic axis of the coil B represented by the arrow 24 as illustrated in Fig. 5A. When the temperature falls to a minimum, current will flow in the coil A and the flux is assumed to be in such a position as to deflect the rotor 23 to the left to the position represented by the arrow 25. Since the coil B is also carrying current the arrow 25 will be at some position representing the resultant of the fluxes of the coils A and B. As the temperature rises to mid scale the rotor 23 will deflect in the other direction toward a resultant position represented by the arrow 26 half way between the coils A and B. At a temperature represented by the 4/5 position on the scale the rotor will take the position of the arrow 27 through the magnetic axis of the coil A, since then the bridge 12, 14, 20, 21 is balanced and no current flows through the coil B. At the maximum temperature the rotor will take up a position represented by the arrow 28 beyond the coil A. The angular distance between the maximum and minimum points 25 and 28 will approach 150 degrees.

It will be observed that the currents in the coils A and B each reverse as well as vary in magnitude in accordance with variations in temperature, thus bringing about the long scale angle of the system.

Although the arrangement of Fig. 5 is particularly well adapted for the measurement of temperature it is not limited thereto and may be used also for the measurement of resistance, for example, or to form a remote position indicator. For example, the resistors 13 and 21 may be replaced by a telemeter transmitter resistor 29, shown in Fig. 5B, having a mid terminal 17 dividing the resistor into two parts, 13' and 21', corresponding to the resistance arms 13 and 21. In place of fixed connections to the ends of the resistor 29 adjustable connections 18' and 22' corresponding to the terminals 18 and 22 of Fig. 5 may be used. The adjustable connections 18' and 22' serve for scale end adjustment. In place of the fixed connection between the resistor 14 and the junction of the bridge arms 13 and 21 a movable brush 30 is utilized in the arrangement of Fig. 5B. The brush 30 is slidable along the resistor 29 in response to change in an indication or a position to be remotely indicated. For example, the brush 30 may be connected by a linkage (not shown) to a float arm attached to a float in a fuel tank in order to form a remote indicating float gauge with a scale angle about 150 degrees long.

If a slightly shorter scale angle is sufficient, a simplified arrangement of Fig. 6 may be employed which utilizes only a single bridge and only one bridge arm, the resistance of which varies with temperature. With this arrangement a scale length of about 120 degrees may be obtained. Any one of the bridge arms may be composed of a resistance material which varies in resistance with temperature. As in Fig. 5 one of the instrument coils A is connected across the conjugate terminals of the bridge 18 and 19. The second coil of the instrument, however, in this case designated B', is utilized as an auxiliary winding and is connected in series with a resistor 31 across one of the arms of the bridge, for example, the bridge arm designated 14". The bridge arm 13" may have a resistance varying with temperature as in the case of Fig. 5. However, a slightly greater deflection may be obtained by making the arm 14" or the arm 12 the temperature variable resistance arm so as to produce variations in current flow in the coil B' as well as in the coil A in response to variations in temperature. It will be understood that if the coil were shunted across a resistor included in a constant resistance circuit, it would act merely as a biasing coil and the current therein would not vary in response to variations in temperature.

It will be understood that the arrangements of Figs. 5 and 6 may also be utilized with a battery having one terminal grounded in order to minimize the number of insulated conductors required. For example, if one of the terminals of the battery 15 is connected to a ground connection 32, the lower ends of the resistors 13, 14, 21, 13", 14" and 31 may be grounded at the most convenient locations instead of being connected by means of insulated conductors to the terminal 17.

The arrangement of Fig. 6 is preferably so adjusted that the bridge is balanced at the center scale position of the instrument and the resistance of the resistor 31 is so chosen that the pointer deflects to the ends of the scale at the temperatures which are to be the maximum and minimum temperatures of the range for which the temperature measuring system is to be used.

In the arrangement of Fig. 7, in order to have a highly compact sensitive arrangement, I employ a main winding A wound from many turns of wire and I employ an auxiliary or control winding B which consists of fewer turns and I connect the winding B in series with the current source 15 to the bridge 11, 12, 13 and 14. In this manner ample current is available for energizing the winding B, since the winding B carries the full bridge current except for that carried by a resistor 33 connected in shunt to the winding B for temperature compensation. The resistor 33 may be made adjustable if desired for the purpose of adjusting scale length, since for a fixed adjustment of the resistor 33 the winding B carries a fixed current, whereas the main winding A carries a reversible current variable in response to variations in temperature. Under normal conditions the resistances are so chosen that the bridge is balanced at the center scale temperature.

The variable resistance arm 13, as in the case of Figs. 5 and 6, may be composed of any suitable resistance material having an adequate temperature coefficient of resistance. It may, for example, consist of thermometer resistance wire wound on an insulated form and enclosed in a protective shell from which it is insulated to form a so-called resistance bulb of the type described in Patent No. 2,149,448, granted to Lederer.

In order to protect the parts of the apparatus in the event of a possible short circuit, I prefer to connect a resistor 34 in series with the current source 15, the resistance of the resistor 34 being determined by the voltage of the source 15.

The manner in which the circuit of Fig. 7 serves to provide indications of temperature and give a wide angle of deflection of the current responsive instrument is shown in Fig. 8. The flux of the winding B which remains substantially constant is represented by the vertical vector and the flux of the coil A at right angles thereto at a given maximum temperature $T_1$ is represented by the vector $T_1$. The rotor of the current-responsive instrument takes up an angular position determined by the resultant of the vectors A and B, viz: the vector R. The corresponding resultant vector for the minimum temperature of the scale is $R_2$. By making the coil A stronger than the coil B it will be observed that a wide angle of deflection is obtained, the angular length of the scale being represented by the angle between the vector R and the dotted vector $R_2$. In the event the temperature varies from $T_1$ to $T_2$ the resultant field produced by the windings A and B is the resultant of the vectors $T_2$ and B or R'. Thus, as the temperature varies the resultant flux and the rotor position varies between the angular positions of R and $R_2$. With a fixed amount of variation in the vector flux A, changes in B will affect the total indicator scale angle. Therefore the scale angle may be adjusted by adjusting the resistance of the shunt 33 to allow for variations in manufacturing tolerances.

One of the important advantages of the circuit of Fig. 7 is the fact that only the winding A need be highly sensitive as the winding B may be excited by any reasonable amount of current. However, if desired the circuit may be rearranged to have the coil B with its compensating shunt and a series resistor shunted around the bridge in which case adjustment of the series resistor would form the adjustment of the length of scale angle. Also the complete bridge may be shunted by an adjustable resistor for adjusting the current through the coil B to control the scale angle.

The manner in which the circuit of Fig. 7 compensates for variations in ambient temperature will be better understood by first considering the operation in the event that the compensating resistor 33 is omitted. It will be assumed that all the resistance other than the resistance of the coils A and B and the resistance of the bulb 13 are relatively constant and will have negligible temperature coefficients of resistance. The resistance of the series resistor 34 tends to swamp out variations in resistance of the coil B and the current flowing through the coil B tends to remain constant as the ambient temperature varies. However, the variation in ambient temperature produces variations in the resistance of the coil A which is wound of copper wire and, consequently, a deflection of the instrument varies with variations in ambient temperature. On the other hand, when the resistor 33 is connected, variations in ambient temperature will cause variations in the diversion of current between the shunt 33 and the auxiliary coil B, because the coil B is wound of copper which varies in resistance with ambient temperature, whereas the resistance of the shunt 33 remains relatively constant. As the temperature rises, causing the current to diminish in the coil A, more current is diverted from the coil B to the shunt 33 and the coil B is accordingly weakened as the current in the coil A is weakened. It will be understood that the most accurate temperature compensation will be obtained by proper selection of the ratios between the resistances of the elements B and 33 at the average ambient temperature. I have found that indications may be made accurate to a fraction of a per cent over an ambient temperature range of from 50 degrees below zero to 70 degrees above zero C.

A current responsive instrument construction, especially well adapted for use with the arrangement of Fig. 7, is illustrated in Figs. 1 to 4. The apparatus here illustrated comprises a suitable insulating base and connection block 35 supporting a housing or frame 36 composed of a material such as cast aluminum, for example, in which are mounted the windings A and B and a magnetic rotor 37 cooperating with the electrical windings A and B.

The main winding A is wound on a separable coil form in order that it may be mounted around the rotor. It may be divided into a plurality of parts so as to form a winding mechanically divisible into a plurality of winding spools, e. g., four winding spools carrying mechanically separate coils 37', 38, 39 and 40, as shown in Figs. 3 and 4. These coils correspond to winding A, Figs. 5, 5A, 6 and 7. The coils 37' to 40 are electrically connected in series, however, by conductors (not shown). For the sake of maximum compactness the coils 37' to 40 are so formed and mounted as to fill as nearly as possible a circumscribing cylinder represented by the inner surface of a magnetic shield 41 composed of suitable high permeability material such as Mu metal, for example. The coils 38 and 39 are left sufficiently narrow, however, to leave space at the sides for thin coils 42 and 43 which form two mechanically separate parts of the auxiliary winding B, which are also electrically connected in series by conductors (not shown). As shown by the drawings in order to fit a circular contour more closely, the outer coils 37' and 40 of the winding A are made narrower than the inner coils 38 and 39. The division of the winding A into four mechanically separate coils makes it possible to wind fully each of the four separate winding parts or coils so as to obtain the maximum winding cross-section in each such part without danger of inadequate mechanical support or difficulty from sliding wires encountered in attempting to wind a coil which is tapered in thickness or has substantially different coil thickness in different parts of the coil. The separability of the winding A also facilitates assembly of the apparatus.

The larger inner coils 38 and 39 are wound on separable winding forms which may be thought of as single-flange spools 44 and 45 comprising flanges 46 and 47 integral with hollow cores or shells 48 and 49 respectively. Each of the shells 48 and 49 is semi-cylindrical in shape so that when the winding forms 44 and 45 are fitted together a cylindrical space is provided within the coils to receive the rotor 37. The shells 48 and 49 may be composed of a suitable conducting material such as copper, so as to form a damping cup. Each has a projection, only one of which, 50, is visible, serving to support winding forms or spools 51 and 52 carrying the coils 37' and 40, respectively. Each of the spools 51 and 52 consists of an inner flat rectangular flange 53 and an outer flange 54 which is a segment of a cylinder with an integral core 55 having an opening fitting the projection 50 of the inner winding form 44 or 45. Countersunk screw holes 56 and threaded holes 57 are provided in the outer and inner winding forms respectively to permit assembly of the winding A by means of screws, only one of which, 58, is shown in Fig. 3. The inner flanges 53 of the outer spools 51 and 52 serve also as outer flanges of the inner spools 44 and 45.

The parts 42 and 43 of the auxiliary winding B are also wound on coil forms or spools 59 which are shown to be thin and slightly curved in order to fit within the cylindrical surface of the shield 41 (Fig. 2). The coil forms 59 for the winding B have long rectangular openings 60 and it will be observed that the flanges 46 and 47 of the inner coil forms of the winding A have side projections 61, of such dimensions as to form a support over which the opening 60 may be fitted when the coil A has been assembled as shown in Fig. 3.

It will be seen that each of the coil forms 59 for the auxiliary winding B serves also to hold together the projection 61 of the coil forms of the main winding A so as to hold this winding in assembled relation as illustrated in Fig. 3. The entire assembly of Fig. 3 is inserted in the Mu metal shield 41 of Fig. 2. The coil forms 59 are also held in place and all parts of the assembly of Fig. 3 are held together, by the shield 41.

For holding the shield 41 within the frame 36 a sub-bridge 62 covering the frame or housing 36 is provided which is secured thereto in any suitable manner as by means of screws 63. An insulating ring 64 is placed over the assembly of Fig. 3 as shown in Fig. 2, and a spring clip 65, fitting between the top bridge 62 and an insulating ring 64, is provided to hold down the insulator 64 and to hold the assembly of Fig. 3 in place within the shield 41.

As illustrated in Figs. 3 and 4 the coil forms 44 and 45 are constructed with apertures 66 to provide space for a spindle 67 supporting the rotor 37. The spindle 67 has pivots at the upper and lower ends cooperating with jewel bearings of conventional type and carries a balanced bent pointer 68 also of conventional type cooperating with a graduated scale (not shown). It will be understood that suitable openings are provided in the insulator 64 and the top bridge 65 to receive the rotor spindle 67.

It will be observed that a pair of terminal lugs 69 is provided for making connections to one of the windings A and a second pair of terminal lugs 70 is provided for making connections to the other of the winding B. The internal connections of the coils are conventional and are not shown.

The top bridge 62 serves also if desired as a support for a pull-off magnet 71 for deflecting the rotor 37 to an off scale position in case of power failure, as described in Patent No. 2,181,803, granted to Faus, or as described in my copending application, Serial No. 465,081, filed November 9, 1942, assigned to the same assignee as the present application. In this case the top bridge is composed of non-magnetic material; but if more complete magnetic shielding should be desired, the top bridge 62 may be composed of permeable magnetic material and a corresponding bottom shield may be placed at the bottom of the shield 41. In that event, I would employ a different form of pull-off magnet and a different mounting arrangement for it. For example, I may mount approximately at the position of the screw 58, a flat plate magnet magnetized in the direction of its thickness, such as shown at 24 in Fig. 9 of the application of Harold T. Faus, Serial No. 295,597, filed September 19, 1939, and assigned to the same assignee as the present application. Suitable material for such a flat magnet is disclosed also in Patent 2,002,445, granted to Arey and Faus.

It will be observed from Figs. 3 and 4 that the winding B is composed of coils which are quite narrow in comparison with the coils comprising the winding A. Accordingly the winding B produces a relatively narrow magnetic field acting upon the rotor 37. The rotor 37 is composed of high-coercive-force, exceedingly light, transversely magnetized material composed of a mixture of sintered oxides, such as described in Patent No. 2,248,616, granted to Faus. The rotor 37 is also similar in shape to the aforesaid rotor described in the above patent, except that it is flattened on the sides 72, the sides being parallel to the line of magnetization 73 passing through the poles N and S of the rotor 37. Fig. 4 illustrates the pointer 68 and the rotor 37 in the position which corresponds to the center scale position of the instrument.

In this position the rotor 37 has its line of magnetization 73 passing through the coils 42 and 43 forming the winding B, thus coinciding with the magnetic axis of the winding B. Owing to the narrowness of the magnetic field of the coil B and the additional fact that the rotor 37 is flattened on the sides so that it also has a narrow magnetic field, the component of force in the direction through the coils 42 and 43 of the winding B acting upon the rotor 37 is greatest when the rotor 37 is in the center coil position illustrated in Fig. 4 and least when the rotor 37 is in either of the end scale positions approaching 90 degrees in either direction from the position illustrated in Fig. 4. Thus, the arrangement overcomes end compression of the scale.

The advantage obtained by the narrow field arrangement just described in connection with the rotor 37 and the auxiliary winding B will be better understood by first considering the action of an instrument in which the main coil A and the cross coil B act with the same effect on the rotor and the rotor is symmetrical with respect to its axis of rotation. Under these circumstances the force of either coil tends to vary sinusoidally with the angular position of the rotor. Deflection is produced in such instruments, however, by variation in field strength of at least one of the coils. Since in the circuit of Fig. 7 the current and field strengths of the winding B are held substantially constant, deflection is produced by variations in strength of the flux produced by the winding A.

In the vector diagram of Fig. 9 the vertical vector B represents the flux produced by the coil B. This vector represents the component of force acting upon the rotor 37 in a direction through the coils 42 and 43 of the winding B. The current and flux in the winding A is assumed to be varied in five successive increments as represented by the horizontal vectors $A_0$ to $A_5$. For these six different values of current in the winding A represented in Fig. 9, there will be six different resulting flux directions represented by the resultant vectors $R_0$, $R_1$, $R_2$, $R_3$, $R_4$ and $R_5$. It will be seen, however, that the angular spacing between the vectors $R_0$ to $R_5$ is not uniform. Consequently, a non-uniform scale is obtained although the effect in the coil A was assumed to be uniform. Such a compression of the end scale region and expansion of the mid scale region may be desired in some cases and the main expanded region may be varied by balancing the bridge of Fig. 7 at a different point from the center scale if desired. However, ordinarily a linear angular deflection is desired.

Referring again to Fig. 9 and recalling that as described in connection with Fig. 4 the instrument there illustrated does not have a uniform cross force acting upon the rotor 37 for different angular positions thereof notwithstanding constancy of current in the winding B, it will be seen that with this type of instrument the vector B no longer represents the component of force acting in a direction through the magnetic axis of the winding B. On the contrary, when the rotor is in the center scale position this component of force, the cross force, as it may be called for convenience, is at a maximum value B' represented by the dotted vector in Fig. 9, and as the rotor deflects toward the end positions of the scale, the cross force falls to a minimum value which will be assumed to be equal to the vector B. The action for scale end positions when the flux of the coil A equals either $A_0$ or $A_5$ is unchanged. However, when the flux of the coil A changes to the value $A_1$ the component of force acting crosswise has increased to $B_1$ and the resultant force is $R'_1$. Then when the flux of the winding A reaches a value $A_2$ the cross component of force rises to the value $B_2$ and the resultant flux is represented by the vector $R'_2$. In a similar manner other values of resultant flux $R'_3$ and $R'_4$ are obtained. It will be seen that there is a substantially linear angular variation between the successive positions of the vectors $R'_0$, $R'_1$, $R'_2$, $R'_3$, $R'_4$ and $R'_5$.

I have herein shown and particularly described certain embodiments of my invention and certain methods of operation embraced therein for the purpose of explaining its practice and showing its application, but it will be obvious to those skilled in the art that many modifications and variations are possible and I aim therefore to cover all such modifications and variations as fall within the scope of my invention which are defined in the appended claims.

What I claim as new and desire to secure by Letters Patent of the United States is:

1. A compact current-responsive device comprising a cylindrical enclosure, a current conducting winding fitted closely into said enclosure and a magnetic rotor mounted within the winding substantially concentrically with said cylindrical enclosure with an axis of rotation substantially coincident with the axis of the cylindrical enclosure and magnetized transversely to such axis, said winding comprising four winding forms and four coils wound thereon, the winding forms having cores which are substantially segments of a cylinder and the coils being built up to form a winding of stepped cross-section largely filling the said cylindrical enclosure, the cores being hollow and the four coils being fitted together with coincident magnetic axes transverse to and substantially intersecting the axis of rotation of the said rotor whereby the winding forms when fitted together form a cylindrical recess for the said rotor.

2. A compact double-coil current-responsive device comprising a cylindrical enclosure, a main current conducting winding, an auxiliary or cross field winding fitted closely into said enclosure, and a magnetic rotor mounted within the main winding substantially concentrically with said cylindrical enclosure with an axis of rotation substantially coincident with the cylindrical axis of the enclosure, and magnetized transversely to such axis, said main winding comprising a winding form with a hollow cylindrical shell forming a recess for the rotor, and flanges extending from the shell defining four coil areas with coil planes parallel to each other and to the cylindrical axis of the shell, and coils wound into said four coil areas to form a winding with a magnetic axis transverse to and substantially intersecting the cylindrical axis and with a cross-section having a circular center and a stepped outline to occupy efficiently the space between the cylindrical core and the said cylindrical enclosure while retaining adequate support for the layers of winding, and the auxiliary winding comprising a pair of coils each occupying the space between one of the edges of the coils of the main winding and an adjacent surface of the cylindrical enclosure.

3. A narrow cross-field current ratio responsive instrument, comprising a rotatably mounted rotor magnetized transverse to its axis of rotation having a greater dimension in the direction along its line of magnetization than in a line transverse to said line and to said axis of rotation, and a field structure comprising a main winding having a magnetic axis substantially intersecting the axis of rotation of the rotor and substantially perpendicular thereto and an auxiliary or cross-field winding having a magnetic axis substantially perpendicular to that of the main winding and to the axis of rotation of the rotor, said auxiliary winding producing a field acting on the rotor which is relatively narrow in comparison with the width of the field produced by the main field winding acting on the rotor, said instrument having a scale with an intermediate point corresponding to the angular position of the rotor with its line of magnetization passing through the auxiliary winding whereby the attraction of said auxiliary winding for the rotor is greatest with the rotor in the said intermediate scale position and least with the rotor in the end scale positions.

4. A narrow cross-field current ratio responsive instrument, comprising a rotatably mounted rotor magnetized transverse to its axis of rotation and a field structure comprising a main winding having a magnetic axis substantially intersecting the axis of rotation of the rotor and substantially perpendicular thereto and an auxiliary or cross-field winding having a magnetic axis substantially perpendicular to that of the main winding and to the axis of rotation of the rotor, said auxiliary winding producing a field acting on the rotor which is relatively narrow in comparison with the field of the main winding acting on the rotor, said instrument having a scale with an intermediate point corresponding to the angular position of the rotor with its line of magnetization passing through the auxiliary winding whereby the attraction of said auxiliary winding for the rotor is greatest with the rotor in the said intermediate scale position and least with the rotor in the end scale positions.

5. A narrow cross-field current ratio responsive instrument, comprising a field structure and a rotatably mounted rotor magnetized in the direction of a line transverse to its axis of rotation, having a cross-section substantially circular but with two flattened sides so as to provide greater dimension in the direction along the line of magnetization than in a line transverse to said line and to said axis of rotation, said field structure comprising a main winding having a magnetic axis substantially intersecting the axis of rotation of the rotor and substantially perpendicular thereto and an auxiliary or cross-field winding having a magnetic axis substantially perpendicular to that of the main winding and to the axis of rotation of the rotor, said instrument having a scale with an intermediate point corresponding to the angular position of the rotor with its lines of magnetization passing through the auxiliary winding whereby the attraction of said auxiliary winding for the rotor is greatest with the rotor in the said intermediate scale position and least with the rotor in the end scale positions.

6. A compact current-responsive device comprising a cylindrical enclosure, a current conducting winding fitted closely into said enclosure and a magnetic rotor mounted within the winding substantially concentrically with said cylindrical enclosure with an axis of rotation substantially coincident with the axis of the cylindrical enclosure and magnetized transversely to such axis, said winding comprising a plurality of winding forms and a plurality of coils wound thereon, the winding forms having cores which are substantially segments of a cylinder, the coils being built up to form a winding of stepped cross-section largely filling the said cylindrical enclosure, the cores being hollow, and the coils being fitted together with coincident magnetic axes transverse to and substantially intersecting the axis of rotation of the said rotor whereby the winding forms when fitted together form a cylindrical recess for the said rotor.

7. A compact current-responsive device comprising a cylindrical enclosure, a current conducting winding fitted closely into said enclosure and a magnetic rotor mounted within the winding substantially concentrically with said cylindrical enclosure with an axis of rotation substantially coincident with the axis of the cylindrical enclosure and magnetized transversely to such axis, said winding comprising a winding form split to permit opening for reception of the magnetic rotor and coils wound thereon, the coils being built up to form a winding largely filling the said cylindrical enclosure and having magnetic axes transverse to said axis of rotation.

8. A compact current-responsive device comprising a cylindrical enclosure, a current conducting winding fitted closely into said enclosure and a magnetic rotor mounted within the winding substantially concentrically with said cylindrical enclosure with an axis of rotation substantially coincident with the axis of the cylindrical enclosure and magnetized transversely to such axis, said winding comprising a winding form and electrically conducting wire wound thereon, the winding form being hollow with a rotor recess therein substantially cylindrical with a cylindrical axis substantially coincident with the axis of the said cylindrical enclosure, the wire being wound around said recess with a magnetic axis transverse to and substantially intersecting the cylindrical axes and the wire largely filling the space between said cylindrical recess and the remainder of said cylindrical enclosure.

9. A compact double-coil current-responsive device comprising a cylindrical enclosure, a main current conducting winding, an auxiliary or cross-field winding fitted closely into said enclosure, and a magnetic rotor mounted within the main winding substantially concentrically with said cylindrical axis with an axis of rotation substantially coincident with the cylindrical axis of the enclosure, and magnetized transversely to such axis, said main winding comprising a winding form with a hollow cylindrical shell forming a recess for the rotor, and flanges extending from the shell defining a plurality of coil areas with coil planes parallel to each other and to the cylindrical axis of the shell and coils wound into said coil areas to form a winding with a magnetic axis transverse to and substantially intersecting the cylindrical axis, and with a cross-section having a circular center and a stepped outline to occupy efficiently the space between the cylindrical core and the said cylindrical enclosure while retaining adequate support for the layers of winding, and the auxiliary winding comprising a pair of coils each occupying the space between one of the edges of the coils of the main winding and an adjacent surface of the cylindrical enclosure.

10. A compact double-coil current-responsive device comprising a cylindrical enclosure, a main current conducting winding, an auxiliary or cross-field winding fitted closely into said enclosure, and a magnetic rotor mounted within the main winding substantially concentrically with said cylindrical enclosure with an axis of rotation substantially coincident with the cylindrical axis of the enclosure, and magnetized transversely to such axis, said main winding comprising a winding form with a hollow shell having a substantially circular center and an outline approaching in shape a flattened circle in order to occupy efficiently the space between the cylindrical core and the cylindrical enclosure, and the auxiliary winding occupying the space between the edge of the main winding forming the flattened side of said circular outline and an adjacent surface of the cylindrical enclosure whereby the cylindrical enclosure is efficiently occupied by electrical winding material.

FREDERICK R. SIAS.